(12) United States Patent
Madabhushi et al.

(10) Patent No.: US 9,430,830 B2
(45) Date of Patent: Aug. 30, 2016

(54) SPATIALLY AWARE CELL CLUSTER (SPACCL) GRAPHS

(71) Applicant: Case Western Reserve University, Cleveland, OH (US)

(72) Inventors: Anant Madabhushi, Beachwood, OH (US); Sahirzeeshan Ali, Cleveland, OH (US)

(73) Assignee: Case Western Reserve University, Cleveland, OH (US)

( * ) Notice: Subject to any disclaimer, the term of this patent is extended or adjusted under 35 U.S.C. 154(b) by 0 days.

(21) Appl. No.: 14/564,298

(22) Filed: Dec. 9, 2014

(65) Prior Publication Data

US 2015/0213598 A1 Jul. 30, 2015

Related U.S. Application Data

(60) Provisional application No. 61/933,415, filed on Jan. 30, 2014.

(51) Int. Cl.
*G06T 7/00* (2006.01)
*G06K 9/62* (2006.01)
*G06K 9/00* (2006.01)

(52) U.S. Cl.
CPC .......... *G06T 7/0012* (2013.01); *G06K 9/0014* (2013.01); *G06K 9/00147* (2013.01); *G06K 9/6212* (2013.01); *G06K 9/6256* (2013.01); *G06T 2207/10088* (2013.01); *G06T 2207/20072* (2013.01); *G06T 2207/30096* (2013.01)

(58) Field of Classification Search
None
See application file for complete search history.

(56) References Cited

U.S. PATENT DOCUMENTS

2008/0033657 A1\* 2/2008 Cline .................. G06K 9/0061 702/19
2012/0237109 A1\* 9/2012 Rajpoot ................ G06T 7/0012 382/134

OTHER PUBLICATIONS

Scott Doyle, "Cascaded discrimination of normal, abnormal, and confounder classes in histopathology: Gleason grading of prostate cancer", BMC Informatics, 2012, http://bmcbioinformatics.biomedcentral.com/articles/10.1186/1471-2105-13-282.\*

\* cited by examiner

*Primary Examiner* — Nirav G Patel
*Assistant Examiner* — Brian Shin
(74) *Attorney, Agent, or Firm* — Eschweiler & Associates, LLC (57) ABSTRACT

Methods, apparatus, and other embodiments associated with objectively predicting disease aggressiveness using Spatially Aware Cell Cluster (SpACCl) graphs. One example apparatus includes a set of logics that acquires an image of a region of tissue, partitions the image into a stromal compartment and an epithelial compartment, identifies cluster nodes within the compartments, constructs a spatially aware stromal sub-graph and a spatially aware epithelial sub-graph based on the cluster nodes and a probabilistic decaying function of the distance between cluster nodes, extracts local features from the sub-graphs, and predicts the aggressiveness of a disease in the region of tissue based on the sub-graphs and the extracted features. Example methods and apparatus may employ a Support Vector Machine classifier to classify super-pixels within the image as stromal super-pixels or epithelial super-pixels.

19 Claims, 6 Drawing Sheets

SPATIALLY AWARE CELL CLUSTER (SPACCL) GRAPHS

CROSS REFERENCE TO RELATED APPLICATIONS

This application claims the benefit of U.S. Provisional Application 61/933,415 filed Jan. 30, 2014.

BACKGROUND

Graph theory may be used to characterize the structure of large complex networks, leading to a better understanding of dynamic interactions that exist between the components of the networks. For example, in biological tissue, nodes with similar characteristics tend to cluster together. The pattern of this clustering provides information about the shared properties of the nodes. Information about the function of the nodes may also be derived from the pattern of the clustering. Networks in biological settings may not be random. Pathological cells may tend to self-organize in clusters and exhibit architectural organization. In particular, many types of cancerous cells may self-organize into clusters and exhibit architectural organization. Networks of cancerous cells may be governed by quantifiable organizing principles. Properties of these organizing principles may be visible in, and extractable from, graphs of such networks.

Spatial graphs and tessellations of pathological tissue, including Voronoi (VT), Delaunay (DT), and minimum spanning trees (MST) built using nuclei as vertices may be predictive of disease severity. For example, VT, DT, and MST graphs have been mined for quantitative features that have been useful in grading prostate and breast cancer. However, these conventional topological methods of grading disease severity focus only on local-edge connectivity. Moreover, conventional graphing methods inherently extract only global features. By extracting only global features, conventional methods are not spatially aware and thus fail to exploit information involving local spatial interactions. Furthermore, conventional methods do not make distinctions between nuclear vertices lying in either the stroma or epithelium. Thus, conventional graphs often traverse the stromal and epithelial regions. Conventional graphing methods may therefore provide sub-optimal results when grading disease severity and patient prognosis.

BRIEF DESCRIPTION OF THE DRAWINGS

The accompanying drawings, which are incorporated in and constitute a part of the specification, illustrate various example apparatus, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

In some types of cancer, epithelial nuclei define tumor architecture and morphology. The role of stromal nuclei may have been overlooked by conventional methods for characterizing disease aggressiveness. Stromal and epithelial regions may interact, and these interactions may have a role in disease aggressiveness and patient prognosis. However, conventional global Voronoi and Delaunay graphs that connect all the nuclei in a region of tissue, including the stromal and epithelial nuclei, may not allow the capture of local tumor heterogeneity. Furthermore, global Voronoi and Delaunay graphs do not allow for the evaluation of the contributions of the stromal and epithelial regions alone. Thus, conventional methods are not spatially aware and do not allow for the quantitative characterization of spatial interactions within the stromal and epithelial regions separately. Additionally, conventional methods do not combine attributes acquired separately from the stromal and epithelial regions.

Conventional methods of identifying more aggressive, rather than indolent, tumors in cancer patients have sought to examine specific morphologic features of these tumors. However, conventional methods have not accurately predicted prognosis, particularly on small specimens such as tissue microarrays. Human papillomavirus-related oropharyngeal squamous cell carcinoma (oSCC), which represents a steadily increasing proportion of head and neck cancers, has a favorable prognosis. Approximately 10% of patients develop a recurrence of the disease, and the remaining patients often suffer major morbidity from treatment. Example apparatus and methods improve over conventional methods by providing a high accuracy, image-based predictor to identify new features in oSCC cancer. Example apparatus and methods provide new insights into the biological factors that drive the progression of oSCC disease in patients.

Example methods and apparatus employ Spatially Aware Cell Cluster (SpACCl) graphs that efficiently and accurately model local nuclear architecture within the stromal and epithelial regions alone. Unlike global graphs in which the vertices are not spatially aware, example methods and apparatus build SpACCl graphs locally on nodes that are defined on clusters of nuclei rather than individual nuclei. Local nodes are connected with edges that have a probability of connectedness that is modelled with a probabilistic decaying function of the relative distance between a pair of nodes. SpACCl graphs are mined for local topological information, including clustering and compactness of nodes. The local topological information provides image biomarkers that offer increased accuracy in distinguishing between indolent and progressive areas of diseased tissue, which in turn offers an improvement in predicting disease aggressiveness and patient prognosis.

Example methods and apparatus employ SpACCl graphs to construct separate graphs for the stromal region and epithelial region found in a single image. The two separate graphs extract features exclusively from the stromal region and the epithelial region. To extract features from both regions, example methods and apparatus employ a super-pixel based support vector machine (SVM) classifier to distinguish epithelium nodes from stromal nodes. The SVM classifier separates the super-pixels in the image into stromal and epithelial compartments. Stromal and epithelial interactions are mined by combining graph features extracted from the two regions. The extracted features are used to train a classifier to identify progressors (e.g., tumors with poor prognosis) and non-progressors. In one embodiment, p16+ oropharyngeal cancer tumors are classified. In other embodiments, other types of diseased tissue may be classified. Example methods and apparatus are not limited to identifying tumors, but may extract features from SpACCl graphs to analyze biological tissue that exhibits local nuclear architecture in discrete regions.

Example methods and apparatus employ SpACCl graphs to capture clustering information about nuclei imaged in a tissue specimen. Topological properties and attributes are extracted from the imaged nuclei. These topological properties and attributes facilitate efficient quantification of tumor morphology that is more accurate than conventional methods. A SpACCl graph G is defined as $G_i = \{V, E\}$ where $i \in \{epithelium, stroma\}$. $V_i$ represents the set of nodes, and $E_i$ represents the set of edges that connect the nodes. The probability that a first node u and a second node v will be connected is based on a decaying function of the Euclidean distance d(u, v) between the nodes.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 1:
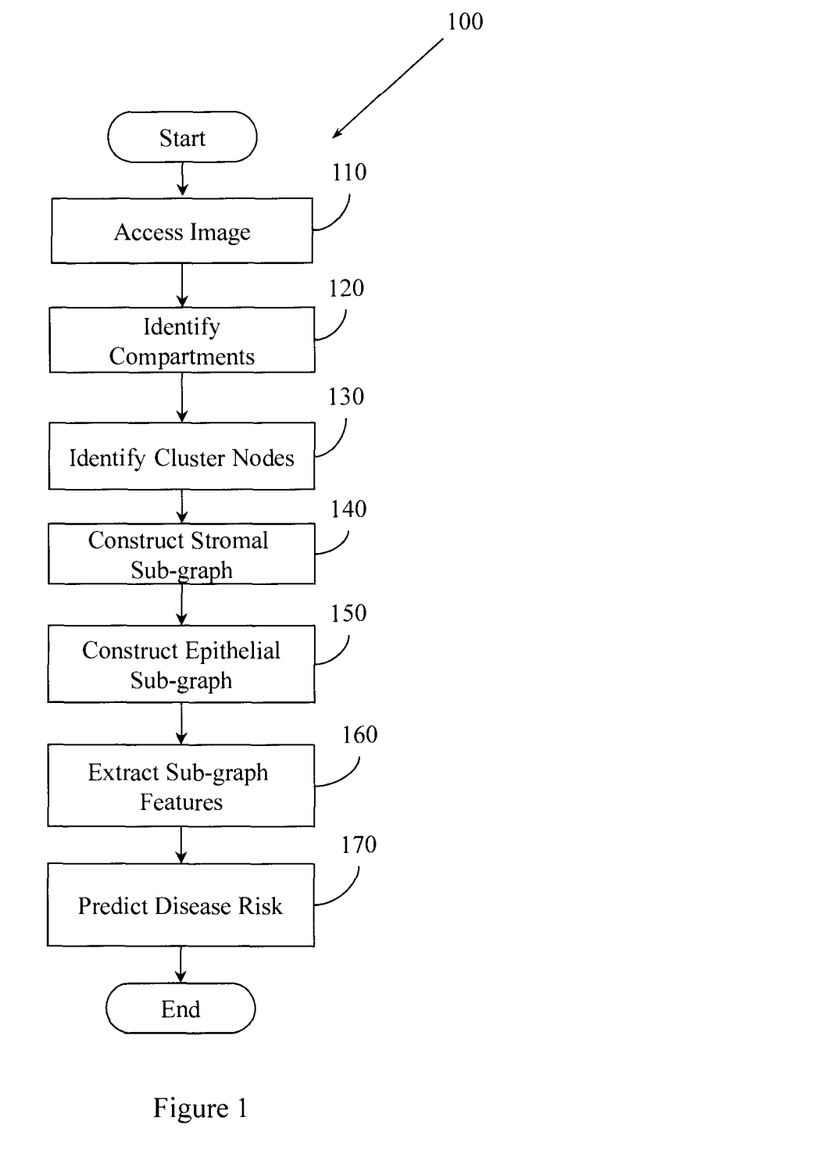
FIG. 1 illustrates an example method of predicting disease risk using a spatially aware cell cluster graph (SpACCl).

FIG. 1 illustrates a computerized method 100 of predicting a risk of disease by examining architectural features of stromal and epithelial tissue with a SpACCl. Method 100 includes, at 110, accessing an image of a region of biological tissue. Accessing an image includes acquiring electronic data, reading from a computer file, receiving a computer file, reading from a computer memory, or other computerized activity. In one embodiment, the image may be a digitally scanned hematoxylin and eosin stain (H&E) image magnified at 400×. In another embodiment, the image may be provided by a magnetic resonance imaging (MRI) apparatus, and thus accessing the image may include interacting with the MRI apparatus. Other imaging apparatus, including automated slide staining systems, may be used to generate and access the image.

Method 100 also includes, at 120, identifying compartments in the image. In one embodiment, a stromal compartment and an epithelial compartment are identified. The stromal compartment and the epithelial compartment are distinguishable from each other. In one embodiment, an SVM classifier is used to identify the stromal compartment and the epithelial compartment.

Method 100 also includes, at 130, identifying a plurality of cluster nodes in the image. A cluster node comprises a plurality of nuclei. Closely spaced nuclei are identified as clusters, and clusters are assigned as nodes. A cluster node identified in the stromal compartment is referred to as a stromal cluster node. A cluster node identified in the epithelial compartment is referred to as an epithelial cluster node. The center of mass of the cluster node may be calculated and used to represent the nodal centroid. In one embodiment, a concavity detector is employed to identify closely spaced nuclei as clusters and assign the clusters as nodes. In other embodiments, other techniques may be employed to identify closely spaced nuclei as clusters and to assign the clusters as nodes.

Method 100 also includes, at 140, constructing a spatially aware stromal sub-graph $G_S$. Constructing the spatially aware sub-graph involves manipulating electronic data and cannot be performed by pen and paper or as mental steps. The stromal sub-graph $G_S$ is constructed by connecting a first stromal cluster node with a second, different, stromal cluster node. The pairwise spatial relationship between stromal cluster nodes is translated to the edges of the SpACCl with a defined probability. In one embodiment, the probability that a first node u and a second node v will be connected is based on the Euclidean distance d(u, v) between the nodes. In one example, a stromal sub-graph $G_S = \{V, E\}$, is defined in the stromal compartment. In graph $G_S$, V represents the set of n stromal cluster centroids as nodes, and E represents the set of edges that connect the nodes. The edges between pairs of nodes u, v are set as a probabilistic decaying function of the Euclidean distance d(u, v) between them. The probability for a link between the nodes u and v is given by $P(u, v) = d(u, v)^{-\alpha}$ where d(u, v) represents the Euclidean distance between u and v. The density of the graph is controlled by $\alpha \geq 0$ where $\alpha$ approaching 0 represents a high probability of connecting nodes while $\alpha$ approaching infinity represents a low probability of connecting nodes. Thus, larger values of $\alpha$ result in a sparser sub-graph. In contrast, as $\alpha$ approaches 0, the graph becomes more densely connected and the graph approaches a complete graph. The value of $\alpha$ may be set empirically, using, for example, a 10-fold cross validation process. Since the probability of more distant stromal cluster nodes being connected is less than the probability of nearer stromal cluster nodes being connected, the set of edges connecting cluster nodes in the stromal sub-graph may be probabilistically defined as:

$$E = \{(u,v): r < d(u,v)^{-\alpha}, \forall u,v \in V_i\}.$$

In this example, r∈[0,1] is a real number that may be generated by a random number generator. Different values of α and different values of r result in graphs of differing density. In one embodiment, $0.2 \le \alpha \le 0.5$ and $0.2 \le r \le 0.5$. In other embodiments, other values for α and r may be employed.

Method 100 also includes, at 150, constructing a spatially aware epithelial sub-graph $G_E$. Constructing the spatially aware sub-graph involves manipulating electronic data and cannot be performed by pen and paper or as mental steps. The epithelial sub-graph $G_E$ is constructed similarly to the stromal sub-graph $G_S$. The epithelial sub-graph $G_E$ is constructed by connecting a first epithelial cluster node u with a second, different, epithelial cluster node v. The probability that the first epithelial cluster node u will be connected with the second epithelial cluster node v is given by $P(u, v) = d(u, v)^{-\alpha}$ where d(u, v) represents the Euclidean distance between u and v. As with the stromal sub-graph, the density of the epithelial sub-graph is controlled by $\alpha \ge 0$ where α approaching 0 represents a high probability of connecting nodes while α approaching infinity represents a low probability of connecting nodes. The set of edges $E_i$ in the epithelial sub-graph $G_E$ is defined as $E_i = \{(u, v): r < d(u, v)^{-\alpha}, \forall u, v \in V_i\}$, where r is a real number between 0 and 1, and where α controls the density of the sub-graph. In one embodiment, $0.2 \le \alpha \le 0.5$ and $0.2 \le r \le 0.5$. In other embodiments, other values for a and r may be employed.

A SpACCl's topological space decomposes into its connected components. The connectedness relation between two pairs of points satisfies transitivity: if u~v and v~w then u~w. If there is a path from u to v and path from v to w, the two paths may be concatenated to form a path from u to w. Being in the same component is an equivalence relation defined on the vertices of the graph, and the equivalence classes are connected components. In a non-directed graph $G_i$, a vertex v is reachable from a vertex u if there is a path from u to v. The connected components of $G_i$ are thus the largest induced subgraphs of $G_i$ that are connected.

Method 100 also includes, at 160, extracting local graph features from the stromal sub-graph $G_S$ and the epithelial sub-graph $G_E$. Within an accessed image, two separate sub-graphs $G_S$ and $G_E$ corresponding to the stromal and epithelial regions are constructed. In one embodiment, local graph features are extracted from the sub-graphs and averaged over the entire sub-graphs $G_S$ and $G_E$ respectively. In one embodiment, local graph features are extracted from the sub-graphs and averaged over less than the entire sub-graphs $G_S$ and $G_E$ respectively. In one embodiment, at 160, an identical set of features are extracted from $G_S$ and $G_E$, $F = \{F^S, F^E\}$ from $G_i$. An optimal feature set $Q^{opt}$ may be identified in which clustering coefficient D and average eccentricity are identified as the top performing features from $F^E$ and number of central points are identified as the top performing feature from $F^S$. In this embodiment, the features extracted from the sub-graphs include a clustering coefficient C, a clustering coefficient D, a giant connected component, an average eccentricity, a percent of isolated points, a number of central points, or a skewness of edge lengths. In other embodiments, other features may be extracted, and the features comprising optimal feature set $Q^{opt}$ may be different features.

A clustering coefficient C describes a ratio of a total number of edges among neighbors of a node to a total maximum possible number of edges among neighbors of the node, per node. The clustering coefficient C is defined as $$\tilde{C} = \frac{\sum_{u=1}^{|V|} C_u}{|V|},$$

where $$C_u = \frac{|E_u|}{\binom{k_u}{2}} = \frac{2|E_u|}{k_u(k_u - 1)}.$$

A clustering coefficient D describes a ratio of a total number of edges among neighbors of a node and the node itself to a total maximum possible number of edges among neighbors of the node and the node itself, per node. The clustering coefficient D is defined as:

$$\tilde{D} = \frac{\sum_{u=1}^{|V|} D_u}{|V|}, \text{ where } D_u = \frac{k_u + |E_u|}{\binom{k_u + 1}{2}} = \frac{2(k_u + |E_u|)}{k_u(k_u + 1)}.$$

A giant connected component describes a ratio between a number of nodes in a largest connected component in the sub-graph and the total number of nodes in the sub-graph.

An average eccentricity is defined as $$\frac{\sum_{u=1}^{V} \epsilon_u}{|V|}.$$

Eccentricity of a $u^{th}$ node $\epsilon_u$, $u = 1 \cdot |V|$, is the maximum value of the shortest path length from node u to any other node on the graph.

A percent of isolated points describes the percentage of isolated nodes in the graph. An isolated node has a degree of 0. A number of central points describes the number of nodes within the graph that have an eccentricity equal to the graph radius. A skewness of edge lengths describes the edge length distribution in the graph.

Using the features extracted at step 160, example methods and apparatus employing a SpACCl provide sparser and more localized representation of nuclear architecture compared to VT. Example methods and apparatus thus identify progressors and non-progressors better than conventional methods. Making an improved identification of progressors and non-progressors may produce the technical effect of improving treatment efficacy and improving doctor efficiency. Treatments and resources may be more accurately tailored to progressors and non-progressors so that more appropriate protocols may be employed. Using a more appropriate protocol may lead to less therapeutics being required for a patient or may lead to avoiding or delaying a resection.

Method 100 also includes, at 170, predicting a disease risk based, at least in part, on the local graph features extracted at 160. In one embodiment, disease risk prediction may be based, at least in part, on the identification of progressors and non-progressors in p16+ oropharyngeal cancers. The identification of progressors and non-progressors is based, at least in part, on the features extracted from sub-graphs $G_S$ and $G_E$. In other embodiments, other features may be extracted, and the risk of other diseases may be predicted.

For example, the risk or aggressiveness of prostate, breast, or other types of cancer may be predicted. Improving disease risk prediction also produces the technical effect of improving treatment efficacy and improving doctor efficiency. When disease aggressiveness is more accurately predicted, those most at risk may receive a higher proportion of scarce resources (e.g., therapeutics, physician time and attention, hospital beds) while those less at risk may be spared unnecessary treatment, which in turn spares unnecessary expenditures and resource consumption.

While FIG. 1 illustrates various actions occurring in serial, it is to be appreciated that various actions illustrated in FIG. 1 could occur substantially in parallel. By way of illustration, a first process could identify stromal and epithelial compartments in the image, a second process could identify cluster nodes, and a third process could construct a stromal sub-graph and an epithelial sub-graph. While three processes are described, it is to be appreciated that a greater or lesser number of processes could be employed and that lightweight processes, regular processes, threads, and other approaches could be employed.

Figure 2:
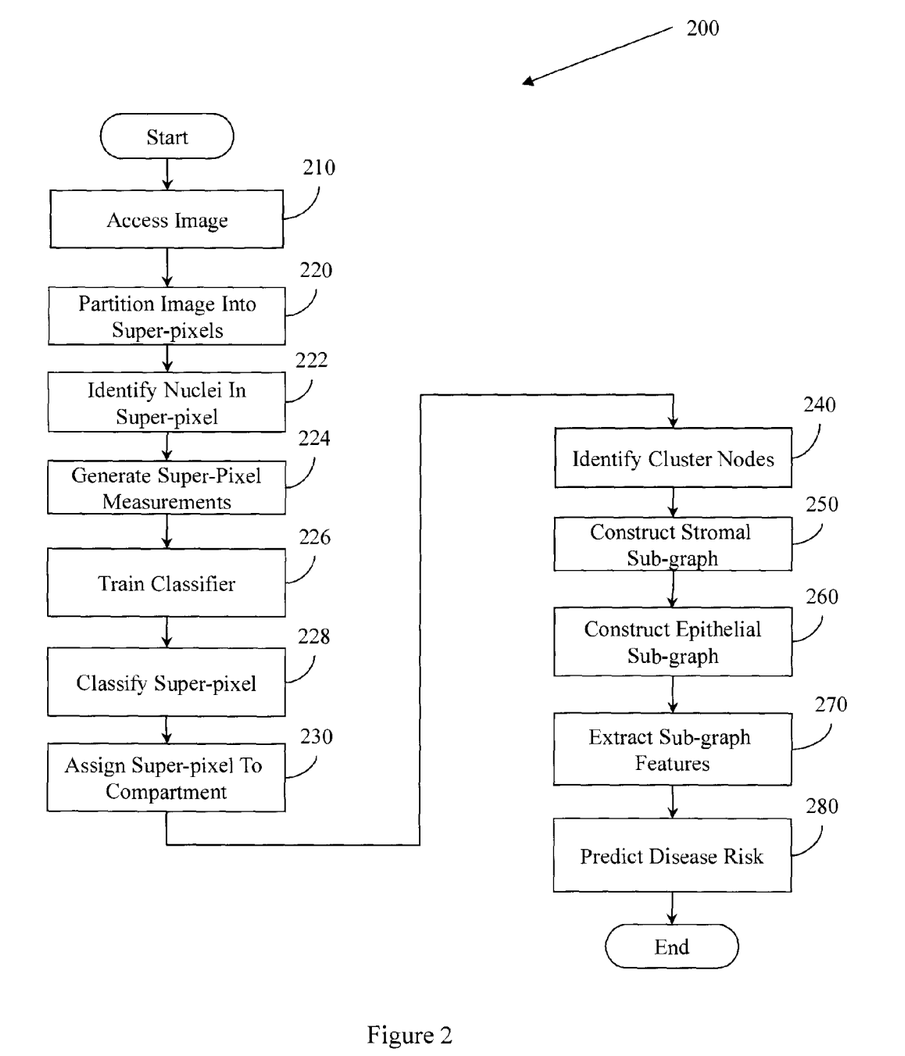
FIG. 2 illustrates an iteration of a method associated with predicting disease risk using a SpACCl.

FIG. 2 illustrates an iteration of a computerized method 200 of predicting a disease risk by examining architectural features of stromal and epithelial tissue with a SpACCl that is similar to method 100. FIG. 2 illustrates in greater detail identifying the stromal compartment and the epithelial compartment. Method 200 includes, at 210, accessing an image of a region of pathological tissue. Accessing the image may include acquiring electronic data, reading from a computer file, receiving a computer file, reading from a computer memory, or other computerized activity.

Method 200 also includes, at 220, partitioning the image into a plurality of spatially coherent super-pixels. In one embodiment, a super-pixel may be defined as a cell that is smaller than the image, where the cell is spatially coherent, and where the image is divided into a plurality of cells. Method 200 includes, at 222, identifying nuclei within a super-pixel. In one embodiment, nuclei within a super-pixel may be identified by performing Dendogram clustering of the mean red-green-blue (RGB) intensity values of the plurality of super-pixels. In other embodiments, other methods may be employed to identify nuclei within the super-pixel.

Method 200 also includes, at 224, generating a set of super-pixel measurements. In one embodiment, method 200 measures the intensity and texture of a super-pixel and neighboring super-pixels. Both local binary patterns and Haralick features may be measured. In other embodiments, other measurements may be acquired to generate the set of super-pixel measurements.

Method 200 also includes, at 226, training a classifier on the set of super-pixel measurements. In one embodiment, the classifier is an SVM classifier. The SVM may be trained on the set of super-pixel measurements using hand-labelled super-pixels. In one example, the set of super-pixels are hand-labelled by a pathologist. The hand-labelled super-pixels are labelled as either stromal super-pixels or epithelial super-pixels. The SVM may be further trained on the sets of features $F^S$ and $F^E$, and on the optimal feature set $Q^{opt}$. In another embodiment, the SVM may be trained using other methods, including supervised learning and unsupervised learning techniques using hand-labelled or non-hand-labelled super-pixels. For example, if a previously machine-labelled set of super-pixels was generated and accepted for use in training the classifier, a machine-labelled set of super-pixels may be used to train the classifier instead of, or in addition to, a human-labelled set.

Method 200 also includes, at 228, employing the classifier to classify a super-pixel as either a stromal super-pixel or an epithelial super-pixel. At 230, upon determining that the super-pixel is a stromal super-pixel, method 200 controls the classifier to assign the stromal super-pixel to the stromal compartment. Alternately, at 230, upon determining that the super-pixel is an epithelial super-pixel, method 200 controls the classifier to assign the epithelial super-pixel to the epithelial compartment.

Method 200 also includes, at 240, identifying a plurality of cluster nodes. In one embodiment, a cluster node comprises a plurality of nuclei. A cluster node identified in the stromal compartment may be identified as a stromal cluster node. A different cluster node identified in the epithelial compartment may be identified as an epithelial cluster node.

At 250, method 200 constructs a spatially aware stromal sub-graph. The spatially aware stromal sub-graph is constructed by connecting a first stromal cluster node to a second stromal cluster node. The probability that the first stromal cluster node will be connected to the second stromal cluster node is based, at least in part, on a probabilistic decaying function of the relative distance between the first stromal cluster node and the second stromal cluster node.

Method 200 also includes, at 260, constructing a spatially aware epithelial sub-graph. Constructing the spatially aware sub-graph involves manipulating electronic data and cannot be performed by pen and paper or as mental steps. The epithelial sub-graph is constructed by connecting a first epithelial cluster node with a second, different epithelial cluster node. The probability that a pair of epithelial cluster nodes will be connected is based on a probabilistic decaying function of the relative distance between the members of the pair of epithelial cluster nodes.

Method 200 also includes, at 270, extracting local sub-graph features from the stromal sub-graph and the epithelial sub-graph. Method 200 then includes, at 280, predicting disease risk, based, at least in part, on the features extracted from the spatially aware stromal sub-graph and the spatially aware epithelial sub-graph. Predicting disease risk may include controlling a display to display the spatially aware sub-graphs. In one embodiment, displaying the stromal sub-graph and the epithelial sub-graph facilitates distinguishing regions of the input image associated with the stromal compartment and the epithelial compartment. Displaying the stromal sub-graph and the epithelial sub-graph also facilitates identifying progressors and non-progressors based on the nuclear architecture displayed in the sub-graphs. The display may include, for example, a computer monitor, a smartphone display, a tablet display, or other displays. Displaying the stromal sub-graph and the epithelial sub-graph may also include printing the stromal sub-graph and the epithelial sub-graph.

In one example, a method may be implemented as computer executable instructions. Thus, in one example, a computer-readable storage medium may store computer executable instructions that if executed by a machine (e.g., computer) cause the machine to perform methods described or claimed herein including method 100, method 200, and method 300. While executable instructions associated with the listed methods are described as being stored on a computer-readable storage medium, it is to be appreciated that executable instructions associated with other example methods described or claimed herein may also be stored on a computer-readable storage medium. In different embodiments the example methods described herein may be triggered in different ways. In one embodiment, a method may be triggered manually by a user. In another example, a method may be triggered automatically.

Figure 3:
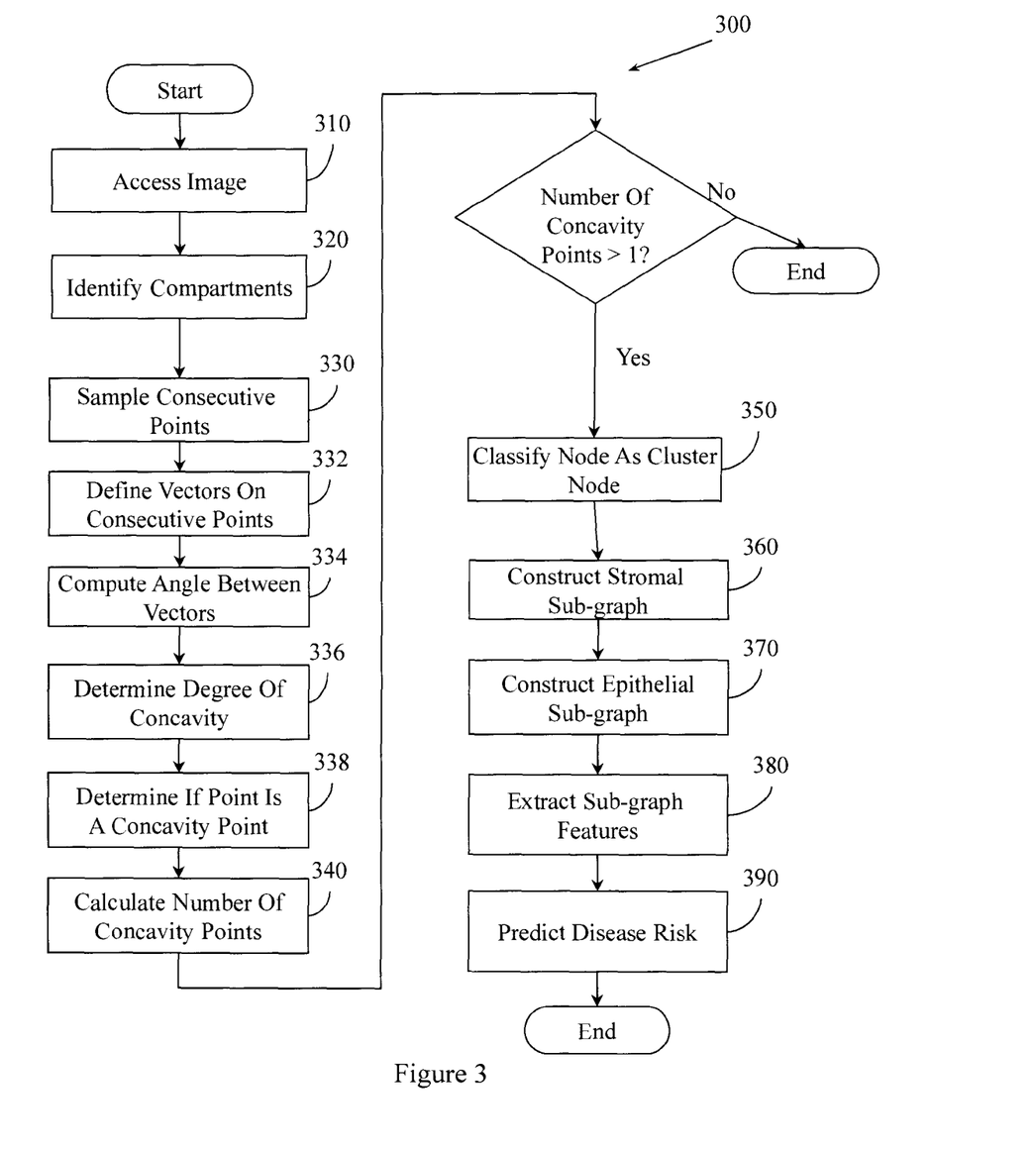
FIG. 3 illustrates an iteration of a method associated with predicting disease risk using a SpACCl.

FIG. 3 illustrates an example method 300. Method 300 predicts disease risk by examining architectural features of stromal and epithelial tissue with a SpACCl graph. FIG. 3 illustrates in greater detail the identification of cluster nodes represented by element 130 in FIG. 1. Method 300 includes, at 310, accessing an image of a region of pathological tissue. Method 300 also includes, at 320, identifying a stromal compartment and an epithelial compartment in the image. The epithelial compartment is distinguishable from the stromal compartment.

Method 300 also includes, at 330, sampling consecutive points on a contour. High concavity points are characteristic of contours that enclose multiple objects and represent junctions where object intersection occurs. At 330, method 300 samples three consecutive points ($c_{w-1}$, $c_w$, $c_{w+1}$) on a contour that surrounds at least one nucleus. Method 300 also includes, at 332, defining a plurality of vectors on the consecutive points ($c_{w-1}$, $c_w$, $c_{w+1}$). Method 300 also includes, at 334, computing the angle $\theta(c_w)$ between the plurality of vectors. Method 300 also includes, at 336, determining a degree of concavity. The degree of concavity is proportional to the angle $\theta(c_w)$. The angle $\theta(c_w)$ can be computed from the dot product relation:

$$\theta(c_w) = \pi - \arccos\left(\frac{(c_w - c_{w-1}) \cdot (c_{w-1} - c_w)}{\|(c_w - c_{w-1})\|\|(c_{w+1} - c_w)\|}\right).$$

Method 300 also includes, at 338, designating a point as a concavity point. A point is determined to be a concavity point if $\theta(c_w) > \theta_t$, where $\theta_t$ is an empirically set threshold degree. Method 300 also includes, at 340, calculating the number of concavity points. Method 300 also includes, at 342, determining if the number of concavity points is greater than or equal to one. The number of concavity points $c_w \geq 1$ indicates the presence of multiple, overlapping or touching nuclei. When multiple overlapping or touching nuclei (e.g., $c_w \geq 1$), are detected, method 300 designates, at 350, the contour as a cluster node. In one embodiment, the center of mass of the cluster is calculated to represent the nodal centroid.

Method 300 also includes, at 360, constructing a spatially aware stromal sub-graph. Constructing the spatially aware sub-graph involves manipulating electronic data and cannot be performed by pen and paper or as mental steps. The stromal sub-graph is constructed similarly to the stromal sub-graph in method 100 and method 200. Method 300 also includes, at 370, constructing a spatially aware epithelial sub-graph. Constructing the spatially aware sub-graph involves manipulating electronic data and cannot be performed by pen and paper or as mental steps. The spatially aware epithelial sub-graph is constructed similarly to the spatially aware epithelial sub-graph in method 100 and method 200. Method 300 also includes, at 380, extracting local sub-graph features from the sub-graphs. Method 300 also includes, at 390, predicting disease risk, based, at least in part, on the sub-graphs constructed at steps 360 and 370, and on the sub-graph features extracted at 380. In one embodiment, method 300 predicts, at 390, the risk of OSCC based, at least in part, on distinguishing progressors and non-progressors in the image. In one embodiment, the SVM classifier, based on the optimal set of features, distinguishes progressors from non-progressors in OSCC tissue with an accuracy of at least 90.2%. Thus, example methods improve on conventional methods that employ Voronoi or Delaunay graphs that only achieve accuracy rates of 74.4% and 76.6%. Also in this example, method 300 can independently distinguish progressors from non-progressors using just the SpACCl feature set for the stromal region $F^S$, with an accuracy of at least 68%. Example methods and apparatus improve the detection of progressors compared to conventional methods by generating and analyzing separate sub-graphs of the stromal and epithelial regions that are sparser than VT and DL graphs generated by conventional methods. Example methods and apparatus also extract features from the sub-graphs that are not extracted by conventional methods, which facilitates making more accurate predictions of patient prognosis. Improving patient prognosis prediction facilitates allocating resources, personnel, and therapeutics to appropriate patients while sparing patients from treatment that might have been prescribed with a less accurate prediction.

Figure 4:
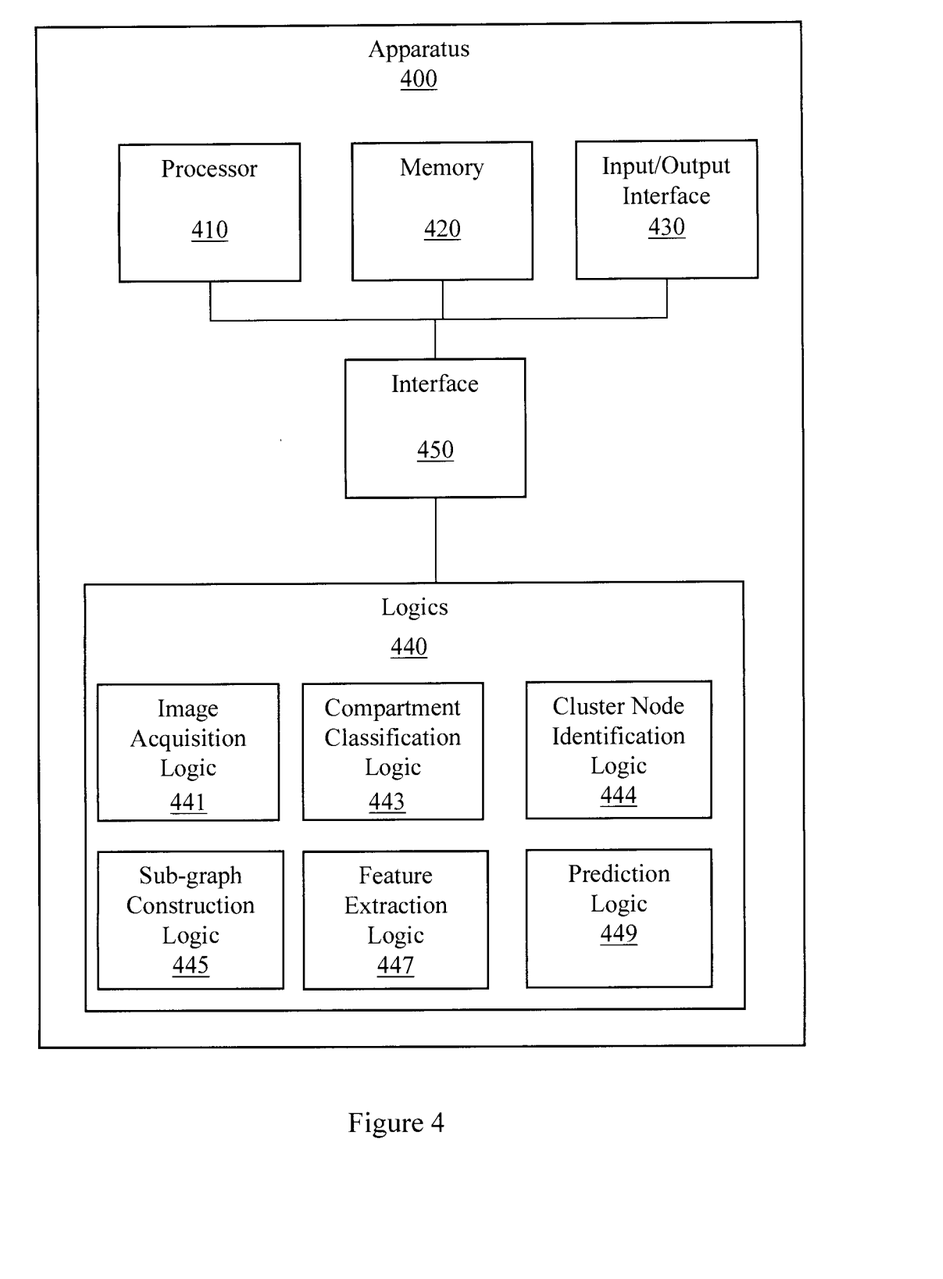
FIG. 4 illustrates an example apparatus that predicts disease aggressiveness using a SpACCl.

FIG. 4 illustrates an example apparatus 400 for predicting disease aggressiveness in biological tissue using a SpACCL. Apparatus 400 includes a processor 410, a memory 420, an input/output interface 430, a set of logics 440, and an interface 450 that connects the processor 410, the memory 420, the input/output interface 430, and the set of logics 440. The set of logics 440 includes an image acquisition logic 441, a compartment classification logic 443, a cluster node identification logic 444, a sub-graph construction logic 445, a feature extraction logic 447, and a prediction logic 449.

Image acquisition logic 441 acquires an image of a region of tissue. In one embodiment, image acquisition logic 441 acquires a digitally scanned H&E stain image magnified at 400X. In another embodiment, images that are made using other staining techniques and magnification levels may be acquired. For example, the image may be provided by a microscope or an automated slide staining system. Thus, accessing the image may include interacting with an electron microscope or the automated slide staining system. Other imaging systems may be used to generate and access the image accessed by image acquisition logic 441.

Compartment classification logic 443 partitions the image into a stromal compartment and an epithelial compartment that is distinguishable from the stromal compartment. In one embodiment, compartment classification logic 443 partitions the image into a plurality of spatially coherent super-pixels. A super-pixel is smaller than the image. Compartment classification logic 443 may perform Dendogram clustering of the mean RGB intensity values for a super-pixel. Compartment classification logic 443 measures the intensity and texture of the super-pixel and the intensity and texture of neighboring super-pixels. Compartment classification logic 443 may also measure local binary patterns and Haralick features.

Compartment classification logic 443 classifies super-pixels as either epithelial super-pixels or stromal super-pixels. A stromal compartment has at least one stromal super-pixel. An epithelial compartment has at least one epithelial super-pixel. In one embodiment, compartment classification logic 443 employs an SVM classifier trained on hand-labelled super-pixels to classify the super-pixels. In another embodiment, a different classifier may be employed. In still another embodiment, the classifier may already be trained, or the classifier may be trained on super-pixels that were machine labelled, or that were labelled by a combination of hand-labelling and machine-labelling.

Cluster node identification logic 444 identifies a cluster of nuclei in the image and designates the identified cluster as a cluster node. Cluster node identification logic 444 detects closely spaced nuclei as a cluster node and assigns the cluster node based on the compartment in which the cluster node is identified. In one embodiment, cluster nodes identified in the stromal compartment are labelled as stromal-cluster nodes, and cluster nodes identified in the epithelial compartment are labelled as epithelial duster nodes. In one embodiment, cluster node identification logic 444 employs a concavity detection algorithm to detect cluster nodes. In this example, duster node identification logic 444 samples three consecutive points on a contour that encloses a cluster of nuclei. Cluster node identification logic 444 computes an angle between a plurality of vectors that are defined by sampling the three consecutive points on the contour. Cluster node identification logic 444 determines a degree of concavity. The degree of concavity is proportional to the angle. Cluster node identification logic 444 designates a point as a concavity point if the angle is greater than an arbitrarily set threshold degree. Cluster node identification logic 444 calculates the number of concavity points. Upon determining that the number of concavity points exceeds a threshold (e.g., one), cluster node identification logic 444 classifies the contour as a cluster node. Other techniques for detecting cluster nodes may be employed.

The set of logics 440 also includes a spatially aware sub-graph construction logic 445. Sub-graph construction logic 445 constructs both a spatially aware stromal sub-graph $G_S$ and a spatially aware epithelial sub-graph $G_E$. Sub-graph construction logic 445 constructs a sub-graph by connecting cluster nodes that belong to the same compartment. The pairwise spatial relation between the nodes is translated to the edges of the SpACCl using a probabilistic decaying function of the Euclidean distance between a pair of cluster nodes in the same compartment. Thus, the probability that a pair of cluster nodes will be connected is a decaying function of the relative distance between the cluster nodes. Within each compartment i, there will be i SpACCl graphs, which in turn are constructed of multiple sub-graphs. A SpACCl graph's topological space decomposes into the SpACCl graph's connected components. Conventional apparatus extract only global features and leave unexploited information that may be found at the local level. Conventional apparatus therefore do not distinguish between the stroma and epithelium. Apparatus 400 separates the image into stromal and epithelial compartments and constructs two separate graphs that allow the combined contributions of stromal and epithelial nuclear architecture to more accurately predict disease aggressiveness and patient outcome.

The set of logics 440 also includes a feature extraction logic 447 that extracts global and local features from the spatially aware stromal sub-graph $G_S$ and the spatially aware epithelial sub-graph $G_E$. In one embodiment, feature extraction logic 447 averages the extracted features over the entire sub-graph $G_S$ and sub-graph $G_E$ respectively. In another embodiment, feature extraction logic 447 may average the extracted features over less than the entire sub-graph $G_S$ and sub-graph $G_E$. In one embodiment, the features extracted include a clustering coefficient C, a clustering coefficient D, a giant connected component, an average eccentricity, a percent of isolated points, a number of central points, or a skewness of edge lengths. In one embodiment, feature extraction logic 447 may determine an optimal set of features $Q^{opt}$ that identifies clustering coefficient D and average eccentricity as the top performing features from $F^E$ and number of central points as the top performing feature from $F^S$. In other embodiments, other features may be extracted, and other optimal set of features $Q^{opt}$ may comprise different features.

The set of logics 440 also includes a disease aggressiveness prediction logic 449. Disease aggressiveness prediction logic 449 predicts the aggressiveness of a disease in the region of tissue based, at least in part, on the features extracted by the feature extraction logic 447. In one embodiment, disease aggressiveness prediction logic 449 distinguishes progressors from non-progressors with at least a 90% accuracy rate when feature extraction logic 447 uses the optimal set of features $Q^{opt}$. In one embodiment, disease aggressiveness prediction logic 449 controls a display to present the spatially aware sub-graphs. In one embodiment, displaying the stromal sub-graph and the epithelial sub-graph facilitates distinguishing regions of the input image associated with the stromal compartment and the epithelial compartment. By displaying the stromal sub-graph and the epithelial sub-graph, disease aggressiveness prediction logic 449 facilitates identifying progressors and non-progressors based on the nuclear architecture displayed in the sub-graphs. The display may include, for example, a computer monitor, a smartphone display, a tablet display, or other displays. Displaying the stromal sub-graph and the epithelial sub-graph may also include printing or storing in a non-transitory computer storage device or computer memory the stromal sub-graph and the epithelial sub-graph.

Figure 5:
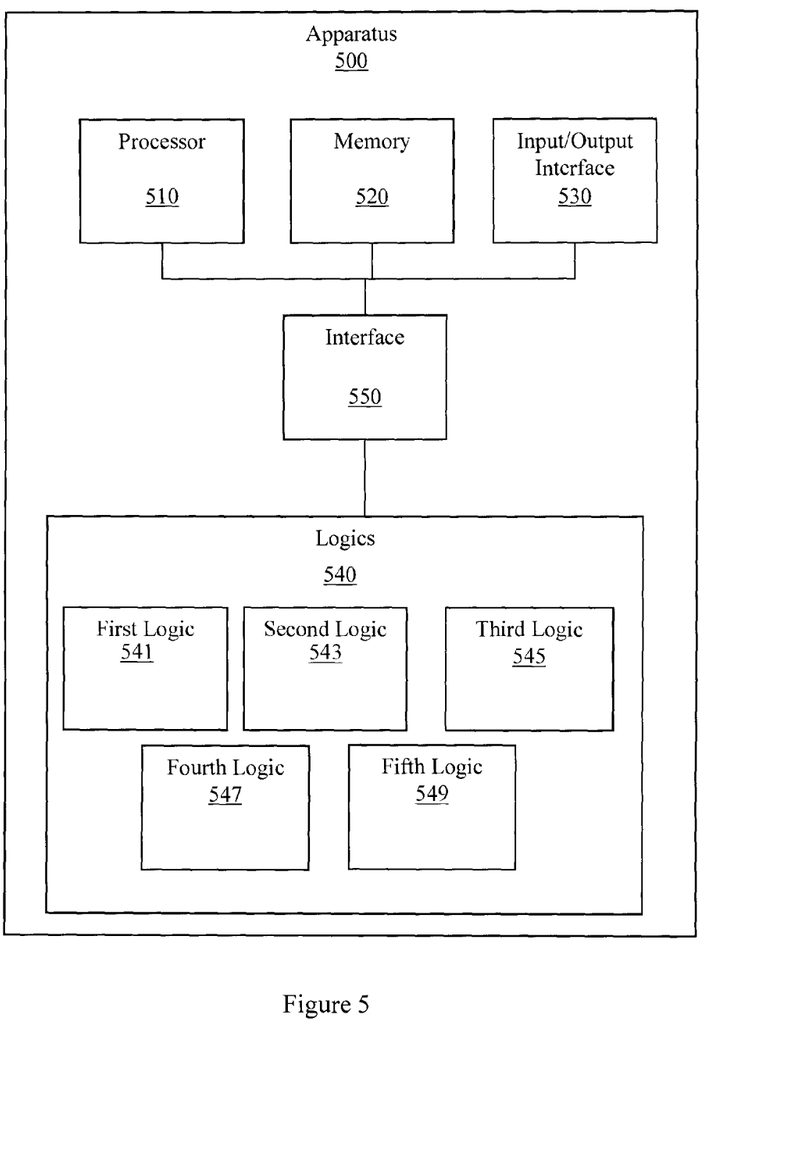
FIG. 5 illustrates an example apparatus that extracts local graph features from a partitioned image using a SpACCl.

FIG. 5 illustrates an example apparatus 500 for analyzing nodal architecture in a region of interest (RoI). The RoI may include, for example, a first compartment that is distinguishable from a second compartment in the RoI. In one embodiment, the RoI may be a section of diseased biological tissue. Apparatus 500 includes a processor 510, a memory 520, an input/output interface 530, a set of logics 540, and an interface 550. Interface 550 connects the processor 510, the memory 520, the input/output interface 530, and the set of logics 540.

The set of logics 540 includes a first logic 541. First logic 541 acquires an image of an RoI. In one embodiment, the RoI is a section of diseased tissue. For example, the RoI may be a section of cancerous tissue. The image may be an H&E stained slide. In other embodiments, the image may be another image type. Acquiring the image includes acquiring electronic data, reading from a computer file, receiving a computer file, reading from a computer memory, or other computerized activity. In one embodiment, the image may be provided from an automated slide staining apparatus or a digital whole slide scanner, and thus accessing the image may include interacting with the automated slide staining apparatus or the digital whole slide scanner. In other embodiments, other imaging techniques, (e.g., electron microscopy) may be employed.

The set of logics 540 includes a second logic 543 that partitions the image into at least the first compartment and the second compartment. In one embodiment, the first compartment is a stromal compartment and the second compartment is an epithelial compartment. Partitioning the image into discrete compartments facilitates constructing separate graphs for each compartment. Separate graphs facilitate extracting features from the different compartments that conventional apparatus fail to exploit. In one embodiment, two compartments are distinguished. In another embodiment, more than two compartments may be distinguished.

The set of logics 540 also includes a third logic 545 that identifies first compartment cluster nodes and second compartment cluster nodes. In one embodiment, third logic 545 divides the image into a plurality of small, spatially coherent super-pixels. Third logic 545 may analyze the super-pixel to identify cellular nuclei within the super-pixel. In another embodiment, a different architectural feature of the super-pixel, other than cellular nuclei, may be identified as the feature defines a cluster of nodes. Third logic 545 analyzes a super-pixel to determine if the super-pixel is a first compartment super-pixel or a second compartment super-pixel. In one example, third logic 545 performs Dendogram clustering of the mean intensity RGB values for a super-pixel. Third logic 545 may measure the intensity and texture of the super-pixel and neighboring super-pixels. Third logic 545 may employ an SVM classifier to classify the super-pixel as being a first compartment super-pixel or a second-compartment super-pixel. Third logic 545 also identifies cluster nodes. In one embodiment, third logic 545 identifies closely spaced clusters of nuclei and designates the closely spaced nuclei as cluster nodes. Third logic 545 may employ a concavity detection algorithm to detect and assign closely spaced clusters of nuclei as cluster nodes. Third logic 545 may calculate the center of mass of a cluster node to represent the nodal centroid.

The set of logics 540 also includes a fourth logic 547 that generates a first compartment sub-graph G1 and a second compartment sub-graph G2. A sub-graph is generated by connecting a first cluster node in a compartment with a second, different cluster node in the same compartment. Fourth logic 547 calculates the probability that the first cluster node will be connected to the second cluster node based on a probabilistic decaying function of the Euclidean distance between the first cluster node and the second cluster node. The density of the graphs is controlled by a constant $\alpha$ where $\alpha \geq 0$.

The set of logics 540 also includes a fifth logic 549 that extracts global metrics and local metrics from the sub-graphs G1 and G2. In one embodiment, the graph G1 corresponds to a stromal region in the image, and the graph G2 corresponds to an epithelial region in the image. Fifth logic 549 averages the extracted metrics over the graphs G1 and G2 respectively. Fifth logic 549 may extract an optimal set of metrics. Fifth logic 549 may display, or store in a computer memory, the graphs G1 and G2 as well as the extracted metrics. Fifth logic 549 may control, for example, a computer monitor, a smartphone display, a tablet display, or other displays to display the graphs G1 and G2 or the extracted metrics. In one embodiment, fifth logic 549 may, alone or in conjunction with a human pathologist, predict disease aggressiveness based, at least in part, on the graphs G1 and G2 and the extracted metrics. In another embodiment, fifth logic 549 may control a computer aided diagnosis (CADx) system to classify the image. For example, fifth logic 549 may control a computer aided breast cancer diagnostic system to train a neural network to grade the image based, at least in part, on the graphs G1 and G2 and the extracted metrics. In other embodiments, other types of CADx systems may be controlled, including CADx systems for grading colon cancer, lung cancer, bone metastases, prostate cancer, and other diseases that exhibit diagnostically significant local nuclear architecture in discrete regions.

Figure 6:
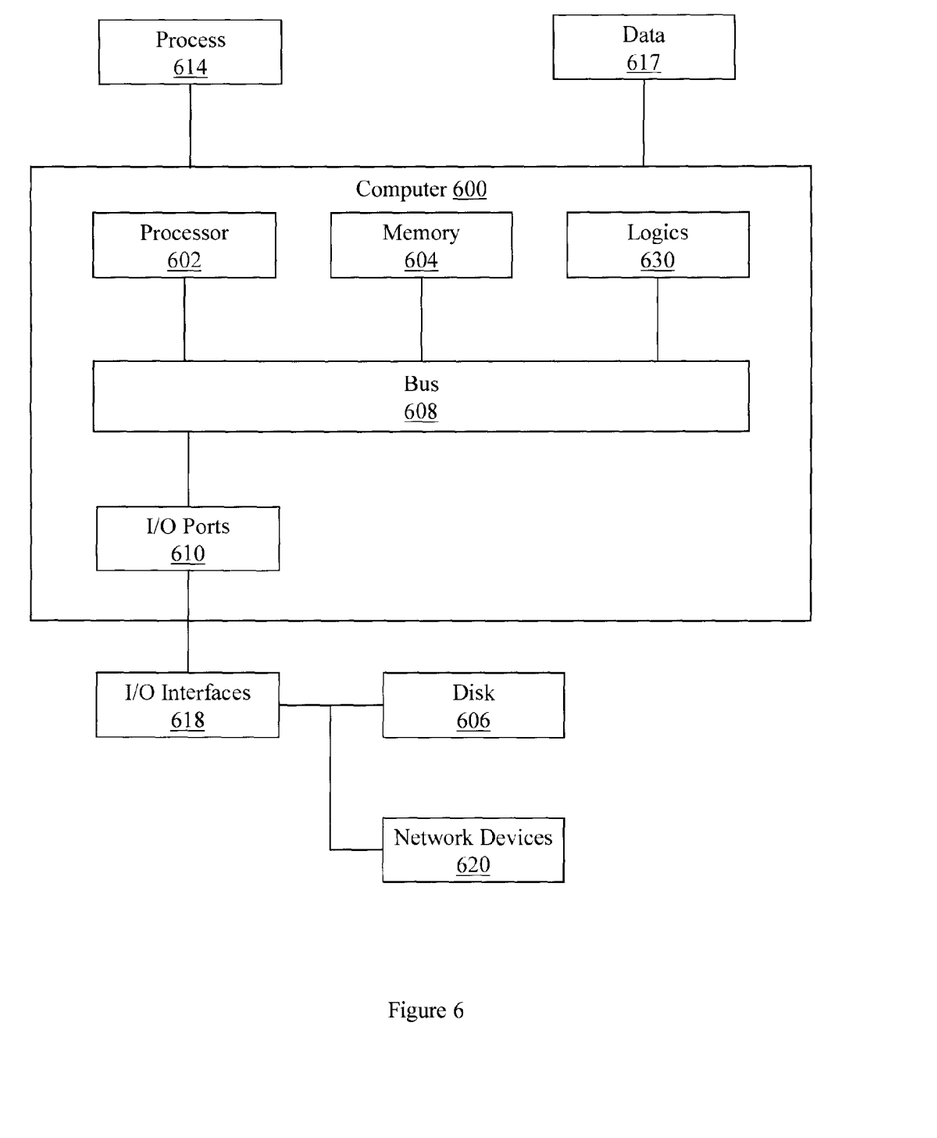
FIG. 6 illustrates an example computer in which example methods and apparatus described herein can operate.

FIG. 6 illustrates an example computer 600 in which example methods illustrated herein can operate and in which example logics may be implemented. In different examples computer 600 may be part of a digital whole slide scanner, may be operably connectable to a digital whole slide scanner, may be part of a microscope, or may be operably connected to a microscope.

Computer 600 includes a processor 602, a memory 604, and input/output ports 610 operably connected by a bus 608. In one example, computer 600 may include a set of logics 630 that perform a method of predicting a risk of disease by examining architectural features of stromal and epithelial tissue with a SpACCl graph. Thus, the set of logics 630, whether implemented in computer 600 as hardware, firmware, software, and/or a combination thereof may provide means (e.g., hardware, software) for predicting a risk of disease by examining architectural features of stromal and epithelial tissue with separate stromal and epithelial SpACCl graphs. In different examples, the set of logics 630 may be permanently and/or removably attached to computer 600.

Processor 602 can be a variety of various processors including dual microprocessor and other multi-processor architectures. Memory 604 can include volatile memory and/or non-volatile memory. A disk 606 may be operably connected to computer 600 via, for example, an input/output interface (e.g., card, device) 618 and an input/output port 610. Disk 606 may include, but is not limited to, devices like a magnetic disk drive, a tape drive, a Zip drive, a flash memory card, or a memory stick. Furthermore, disk 606 may include optical drives like a CD-ROM or a digital video ROM drive (DVD ROM). Memory 604 can store processes 614 or data 616, for example. Disk 606 or memory 604 can store an operating system that controls and allocates resources of computer 600.

Bus 608 can be a single internal bus interconnect architecture or other bus or mesh architectures. While a single bus is illustrated, it is to be appreciated that computer 600 may communicate with various devices, logics, and peripherals using other busses that are not illustrated (e.g., PCIE, SATA, Infiniband, 1394, USB, Ethernet).

Computer 600 may interact with input/output devices via I/O interfaces 618 and input/output ports 610. Input/output devices can include, but are not limited to, digital whole slide scanners, a keyboard, a microphone, a pointing and selection device, cameras, video cards, displays, disk 606, network devices 620, or other devices. Input/output ports 610 can include but are not limited to, serial ports, parallel ports, or USB ports.

Computer 600 may operate in a network environment and thus may be connected to network devices 620 via I/O interfaces 618 or I/O ports 610. Through the network devices 620, computer 600 may interact with a network. Through the network, computer 600 may be logically connected to remote computers. The networks with which computer 600 may interact include, but are not limited to, a local area network (LAN), a wide area network (WAN), or other networks.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage medium", as used herein, refers to a medium that stores instructions or data. "Computer-readable storage medium" does not refer to propagated signals. A computer-readable storage medium may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage medium may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, and other media from which a computer, a processor or other electronic device can read.

"Logic", as used herein, includes but is not limited to hardware, firmware, software in execution on a machine, or combinations of each to perform a function(s) or an action(s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

To the extent that the term "includes" or "including" is employed in the detailed description or the claims, it is intended to be inclusive in a manner similar to the term "comprising" as that term is interpreted when employed as a transitional word in a claim.

Throughout this specification and the claims that follow, unless the context requires otherwise, the words 'comprise' and 'include' and variations such as 'comprising' and 'including' will be understood to be terms of inclusion and not exclusion. For example, when such terms are used to refer to a stated integer or group of integers, such terms do not imply the exclusion of any other integer or group of integers.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. A non-transitory, computer-readable storage medium storing computer-executable instructions that when executed by the computer control the computer to perform a method for predicting a risk of disease by examining architectural features of stromal and epithelial tissue with a spatially aware cell cluster graph (SpACCl), comprising:
   accessing an image of a region of pathological tissue;
   identifying a stromal compartment in the image;
   identifying an epithelial compartment in the image, where the epithelial compartment is distinguishable from the stromal compartment;
   identifying a plurality of cluster nodes in the image, where a cluster node comprises a plurality of nuclei, and where identifying a plurality of cluster nodes comprises:
      identifying a stromal cluster node in the stromal compartment, and
      identifying an epithelial cluster node in the epithelial compartment;
   constructing electronic data associated with a spatially aware stromal sub-graph $G_S$ by connecting a first stromal cluster node with a second, different stromal cluster node, where the probability that the first stromal cluster node is connected with the second stromal cluster node is based, at least in part, on a probabilistic decaying function of the relative distance between the first stromal cluster node and the second stromal cluster node;
   constructing a spatially aware epithelial sub-graph $G_E$ by connecting a first epithelial cluster node with a second, different epithelial cluster node, where the probability that the first epithelial cluster node is connected with the second epithelial cluster node is based, at least in part, on a probabilistic decaying function of the relative distance between the first epithelial cluster node and the second epithelial cluster node;
   extracting local graph features from the sub-graphs $G_S$ and $G_E$; and
   predicting the risk of disease, based, at least in part, on the local graph features.

2. The non-transitory, computer-readable storage medium of claim 1, where identifying a stromal compartment in the image and identifying an epithelial compartment in the image comprises:
   partitioning the image into a plurality of spatially coherent super-pixels;
   identifying nuclei within a super-pixel;
   generating a set of measurements by measuring the intensity and texture of the super-pixel and a neighboring super-pixel;
   training a classifier on the set of measurements;
   using the classifier to classify the super-pixel as either a stromal super-pixel or epithelial super-pixel;
   upon determining that the super-pixel is a stromal super-pixel, assigning the stromal super-pixel to the stromal compartment; and
   upon determining that the super-pixel is an epithelial super-pixel, assigning the epithelial super-pixel to the epithelial compartment.

3. The non-transitory, computer-readable storage medium of claim 2, where the classifier is a Support Vector Machine (SVM) classifier, and where the SVM classifier is trained on the set of measurements using hand-labelled super-pixels.

4. The non-transitory, computer-readable storage medium of claim 1, where identifying a plurality of cluster nodes in the image comprises:
   sampling three consecutive points ($c_{w-1}$, $c_w$, $c_{w+1}$) on a contour;
   computing an angle $\theta(c_w)$ between a plurality of vectors, where the plurality of vectors is defined by sampling the three consecutive points on the contour;
   determining a degree of concavity, where the degree of concavity is proportional to the angle $\theta(c_w)$;
   designating a point as a concavity point if $\theta(c_w) > \theta_t$, where $\theta_t$ is an empirically set threshold degree;

calculating a number of concavity points, and
upon determining that the number of concavity points $c_w \geq 1$,
classifying the contour as a cluster node.

5. The non-transitory, computer-readable storage medium of claim 1, where the probabilistic decaying function of the relative distance between the first stromal cluster node and the second stromal cluster node is defined as:

$$P(u,v)=d(u,v)^{-\alpha},$$

where
u represents the first stromal cluster node,
v represents the second stromal cluster node, and
$0 \leq \alpha$.

6. The non-transitory, computer-readable storage medium of claim 1, where the probabilistic decaying function of the relative distance between the first epithelial cluster node and the second epithelial cluster node is defined as:

$$P(u,v)=d(u,v)^{-\alpha},$$

where
u represents the first epithelial cluster node,
v represents the second epithelial cluster node, and
$0 \leq \alpha$.

7. The non-transitory, computer-readable storage medium of claim 6, where a set of edges $E_i$ in the sub-graph $G_S$ or the sub-graph $G_E$ is defined as $E_i = \{(u, v): r < d(u, v)^{-\alpha}, \forall u, v \in V_i\}$, where r is a real number between 0 and 1, and where $\alpha$ controls the density of the sub-graph.

8. The non-transitory, computer-readable storage medium of claim 7, where extracting local graph features from the sub-graph $G_S$ and the sub-graph $G_E$ comprises extracting a clustering coefficient C, a clustering coefficient D, a giant connected component, an average eccentricity, a percent of isolated points, a number of central points, or a skewness of edge lengths.

9. The non-transitory, computer readable storage medium of claim 8, where the clustering coefficient C describes a ratio of a total number of edges among neighbors of a cluster node to a total maximum possible number of edges among neighbors of the cluster node, per cluster node, where the clustering coefficient C is defined as:

$$\tilde{C} = \frac{\sum_{u=1}^{|V|} C_u}{|V|}, \text{ where } C_u = \frac{|E_u|}{\binom{k_u}{2}} = \frac{2|E_u|}{k_u(k_u-1)}.$$

10. The non-transitory, computer readable storage medium of claim 8, where the clustering coefficient D describes a ratio of a total number of edges among neighbors of a cluster node and the cluster node itself to a total maximum possible number of edges among neighbors of the cluster node and the cluster node itself, per cluster node, where the clustering coefficient D is defined as $$\tilde{D} = \frac{\sum_{u=1}^{|V|} D_u}{|V|}, \text{ where } D_u = \frac{k_u + |E_u|}{\binom{k_u+1}{2}} = \frac{2(k_u + |E_u|)}{k_u(k_u+1)}.$$

11. The non-transitory, computer-readable storage medium of claim 8, where the giant connected component describes a ratio between a number of cluster nodes in a largest connected component in the sub-graph and the total number of cluster nodes in the sub-graph.

12. The non-transitory, computer-readable storage medium of claim 8, where average eccentricity is defined as $$\frac{\sum_{u=1}^{|V|} \epsilon_u}{|V|},$$

where eccentricity of a $u^{th}$ cluster node $\epsilon_u$, $u=1 \cdot |V|$, is the maximum value of the shortest path length from cluster node u to any other cluster node on the sub-graph.

13. The non-transitory, computer-readable storage medium of claim 8, where the percent of isolated points describes the percentage of isolated cluster nodes in the sub-graph, where an isolated cluster node has a degree of 0.

14. The non-transitory, computer-readable storage medium of claim 8, where the number of central points describes the number of cluster nodes within the sub-graph that have an eccentricity equal to the sub-graph radius.

15. The non-transitory, computer-readable storage medium of claim 8, where the skewness of edge lengths describes the edge length distribution in the sub-graph.

16. An apparatus for predicting disease aggressiveness using a spatially aware cell cluster graph, comprising:
a processor;
a memory;
an input/output interface;
a set of logics; and
an interface to connect the processor, the memory, the input/output interface and the set of logics, the set of logics comprising:
an image acquisition logic that acquires an image of a region of tissue;
a compartment classification logic that partitions the image into a stromal compartment and an epithelial compartment;
a cluster node identification logic that identifies a cluster of nuclei as a cluster node;
a sub-graph construction logic that constructs a stromal sub-graph $G_S$ and an epithelial sub-graph $G_E$ where the sub-graph construction logic constructs the stromal sub-graph $G_S$ by linking a first stromal cluster node and a second, different stromal cluster node, where the probability that the first stromal cluster node will be linked to the second stromal cluster node is based, at least in part, on a probabilistic decaying function of the distance between the first stromal cluster node and the second stromal cluster node, and where the sub-graph construction logic constructs the epithelial sub-graph $G_E$ by linking a first epithelial cluster node and a second, different epithelial cluster node, where the probability that the first epithelial cluster node will be linked to the second epithelial cluster node is based, at least in part, on a probabilistic decaying function of the distance between the first epithelial cluster node and the second epithelial cluster node;
a feature extraction logic that extracts global features and local features from the stromal sub-graph $G_S$ and the epithelial sub-graph $G_E$; and
a disease aggressiveness prediction logic that produces electronic data that predicts the aggressiveness of a disease in the region of tissue, based, at least in part, on the global features and local features.

17. The apparatus of claim 16, where the compartment classification logic partitions the image into a set of super-pixels, identifies nuclei within a super-pixel, generates a set of measurements by measuring the intensity and texture of the super-pixel and neighboring super-pixels, and classifies the super-pixel as being a stromal super-pixel or an epithelial super-pixel by training a Support Vector Machine (SVM) classifier on the set of measurements with hand-labelled super-pixels from a plurality of images, where a stromal-compartment comprises at least one stromal super-pixel, and an epithelial compartment comprises at least one epithelial super-pixel.

18. The apparatus of claim 16, where the cluster node identification logic:

samples three consecutive points ($c_{w-1}$, $c_w$, $c_{w+1}$) on a contour that encloses the cluster of nuclei, computes an angle $\theta(c_w)$ between a plurality of vectors, where the plurality of vectors is defined by sampling the three consecutive points on the contour, determines a degree of concavity, where the degree of concavity is proportional to the angle $\theta(c_w)$, designates a point as a concavity point if $\theta(c_w) > \theta_t$, where $\theta_t$ is an empirically set threshold degree, calculates the number of concavity points, and upon determining that the number of concavity points $c_w \geq 1$, and classifies the contour as a cluster node, where a cluster node in the epithelial compartment is an epithelial cluster node, and where a cluster node in the stromal compartment is a stromal cluster node.

19. An apparatus comprising:
a processor;
a memory;
an input/output interface;
a set of logics; and
an interface to connect the processor, the memory, the input/output interface and the set of logics, the set of logics comprising:
a first logic that acquires an image of a region of interest;
a second logic that partitions the image into at least a first compartment and a second compartment, where the second compartment is distinguishable from the first compartment;
a third logic that identifies cluster nodes, where a cluster node identified in the first compartment is a first compartment cluster node, and a cluster node identified in the second compartment is a second compartment cluster node;
a fourth logic that generates a first compartment sub-graph G1 and a second compartment sub-graph G2, where a sub-graph is generated by connecting a first cluster node in a compartment with a second, different cluster node in the same compartment, where the probability the first cluster node will be connected to the second cluster node is based on a probabilistic decaying function of the Euclidean distance between the first cluster node and the second cluster node, where the density of the sub-graph is controllable, and
a fifth logic that extracts global metrics and local metrics from the sub-graphs G1 and G2 and controls an automated diagnostic system to classify the image, based, at least in part, on the global metrics and local metrics.

* * * * *